ically and advanced between guides, in the form of panels of larger sizes than the ordinary commercial sizes; these panels are subsequently divided, when their coverings have been applied to them, according to the dimensions desired.

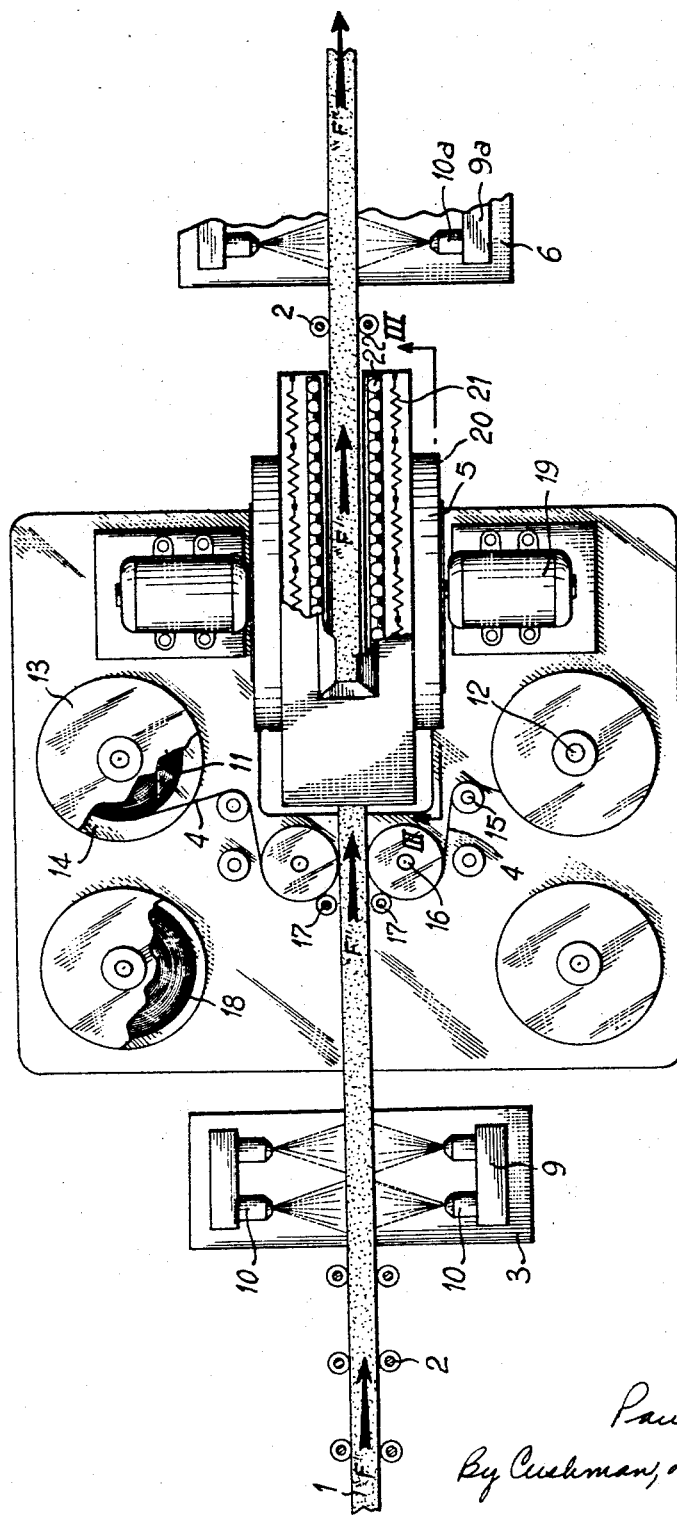

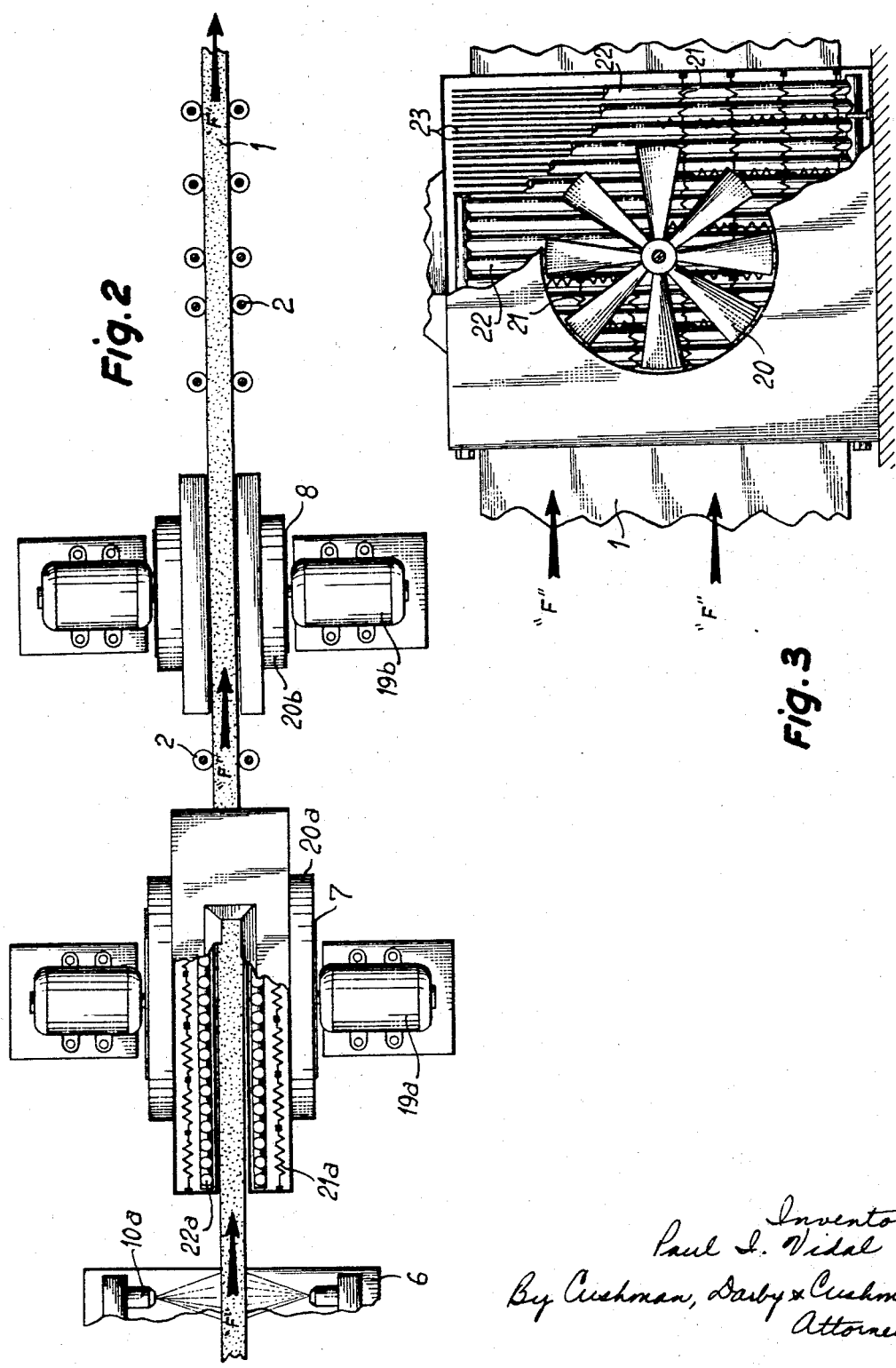

United States Patent Office 3,441,461
Patented Apr. 29, 1969

3,441,461
PROCESS AND MACHINE FOR THE CONTINUOUS APPLICATION OF PROTECTIVE OR DECORATIVE COVERINGS
Paul I. Vidal, Villepinte, France, assignor to Rocma Anstalt, Naduz, Liechtenstein, a corporation of Liechtenstein
Filed Feb. 9, 1965, Ser. No. 431,340
Claims priority, application France, Feb. 13, 1964, 963,635
Int. Cl. B32b 7/12, 31/10
U.S. Cl. 156—285                                            13 Claims

ABSTRACT OF THE DISCLOSURE

Ways and means are described for continuously applying a protective, decorative coating to vertically-oriented panels by advancing them between guides, coating their faces with an adhesive resin, unrolling a covering strip onto each face and lightly applying it with rolling pressure, and projecting air at a temperature in the range between ambient temperature and 100° C. onto each of the covered faces to hold the strips against the panel faces by flexible pressure while polymerizing, hardening and drying the adhesive resin. In much the same manner, successive sheets and coatings may be applied to the covered panel faces.

---

The present invention relates to a process and a machine for the continuous application of a protective and/or decorative covering to panels or members of panels.

Panels thus covered are known already and, in general, they can be obtained by different types of process.

According to a first type of process, leading to what are known as laminated panels, a substratum of covering is prepared consisting of a plurality of layers of materials in sheets, assembled without pressure; this substratum is then stuck to a core, for example of plywood. Two consecutive operations are therefore necessary in order to obtain these panels.

This first type of process leads to panels of good quality but with a high production cost because the substratum is obtained by vigorous pressing, while hot, which necessitates expensive capital inventment in complicated equipment (powerful presses working on large surfaces; devices for drying the covering sheets, before manufacture, devices for heating and cooling the press etc.) which has the disadvantage of working discontinuously. Moreover, since the working temperatures are of the order of 120° to 160° C. on the one hand the materials used have to be carefully dried before use if it is desired to avoid deformation or blistering, and on the other hand, a considerable quantity of power is consumed, first for the heating of the press and then for the cooling of the coverings.

Moreover, in view of its high cost, this process is not likely to be used for applying protective coverings to the opposite faces of one and the same panel.

Moreover, the percentage of rejects is high.

Finally, the operation of the presses is discontinuous and necessitates low rates of production.

According to a second process, which is applicable to panels made of materials which can be non-rigid during the operation, the opposite faces of a panel, forming the core, are pressed between the platens of a press, with covering sheets and adhesives interposed. Nevertheless, this process is generally carried out in a discontinuous manner and does not enable very uniform surfaces to be obtained because of the lack of rigidity in the core.

According to other processes, the continuous covering of one face of a panel is effected. Nevertheless, this is not applicable to rigid materials because the stresses originating at the only face covered lead to a lack of balance in the product and to its deformation.

Finally, all the known processes are carried out by placing the panels horizontally.

The aim of the applicant has been to perfect a process applicable to the manufacture of rigid panels, or semi-rigid panels, continuously covered on both faces, which process can be carried out by simple means which only involve little capital investment.

If the processes already known are examined, the first one mentioned above is not applicable; the second is not applicable either, because pressing of the panel is effected, which is a difficult operation to carry out when the latter is of rigid material because of the deterioration which it might suffer in the event or an irregular application of pressure; finally, none of the three above-mentioned processes is applicable in practice because the application of the covering is effected horizontally; with this procedure, it would be very difficult to obtain conditions for the treatment of the opposite faces of the panel sufficiently alike to avoid the risk of subsequent deformation; furthermore, a horizontal arrangement necessarily leads to the lower face being in contact with means of support which, in a continuous process, are liable to leave traces or trails on said surface.

Accordingly, the aim of the applicant has been to perfect a process permitting the continuous application of a protective and/or decorative covering to be effected on panels, using means which do not involve high capital investment, leading to a stable material of an extremely satisfactory quality, and finally permitting very high rates of production.

For this purpose, according to the invention, the continuous application of a protective and/or decorative covering to semi-rigid or rigid panels or members of panels is carried out by:

causing a panel or a succesion of panels, directed substantially vertically, to advance between appropriate guide means, coating the faces of the panel or of the panel members with an adhesive resin, continuously unrolling a strip of covering against each of the faces and by applying said strips by means of a roller exerting a weak pressure, and projecting air at a temperature comprised between ambient temperature and 100° C. against each of the faces thus covered, to hold the strips applied, by flexible pressure, against the panel or the panel members, and to harden and dry the adhesive resin.

Thus it can be seen that, according to the process in accordance with the invention, the panels are directed substantially vertically; in consequence, the conditions for applying a covering to their two faces will enable them to be absolutely identical. The result is a satisfactory equilibrium between the stresses on the two opposite faces of the panel and therefore stability in the product obtained.

Then it will be noted that, after the covering has been brought into contact with the panel by means of a single roller exerting a slight pressure, the covering strip is held in the correct position by a blast of air which simultaneously causes or encourages the hardening, the polymerisation or the drying of the resin used.

It will be understood that it is thus possible to achieve a satisfactory application of the covering without running the risk of applying pressures on the panel which might lead to even local partial crushing. This is particularly important in the case of panels of expanded thermosetting resin which could not be restored to their proper condition as would be the case with expanded thermoplastic materials, the deterioration in the material being irreversible.

Moreover, it may be noted that the air used to hold the covering in position and to dry the adhesive securing it to the panel is at a temperature comprised substantially between the ambient temperature and 100° C., and in the majority of cases of the order of 20 to 40° C.

This is relatively important because, in the case of the materials to which a covering is applied by means of a press, the temperatures to which the whole is subjected in the course of pressing are fairly high.

The result is a risk of serious deformation in the panels unless their percentage of humidity has been fixed and controlled with great precision.

Actually, during the pressing operation, it is important that the percentage of humidity should be very low so as to avoid the copious release of water vapour capable of causing blistering and deformation. On the other hand, when such a panel has left the press, it is often essential to increase the percentage of humidity which it contains in order that no deformation may occur subsequently during its use. Thus it will be seen that the application of coverings to panels by means of a press, while hot, raises technical problems which are difficult to solve.

By contrast, according to the invention, it may be noted:

on the one hand that the panels are only subjected to extremely low pressures (applicator rolls adapted simply to bring the covering strip into contact with the panel and to remove bubbles from the adhesive, plus holding in position by means of jets of air) and,
on the other hand, that the panels are only subjected to a relatively low temperature (air, at a temperature comprised between the ambient temperature and 100° C.), which renders supervision of the percentage of humidity they contain less important. In this connection, with non-thermosetting adhesives, cold air could be used, while with thermosetting adhesives, hot air is preferable (from 40° to 100° C.).

Furthermore, the process according to the invention can be applied several times in succession to one and the same panel. It is likewise possible, subsequent to the application of a covering, to project onto said panel, a protective layer of varnish or of resin, subjected to drying by an air blast. On this assumption, it is important that, between the moment when the resin is applied to the panel, and the moment when it is completely dry, nothing should come into contact with said surface so as not to risk leaving traces or trails on the protective layer while still fresh.

Now this is only possible in practice by using the arrangement adopted by the present invention, that is to say, by placing the panel or the succession of panel members vertically; actually, it is then possible to eliminate, over a certain length, the lateral guide means for the panel (simply supported by rollers below the lower edge) without its being subjected to stresses liable to deform it.

Other features and advantages of the invention will be apparent from the following description, given by way of non-limiting example, with reference to the accompanying drawings relating to an embodiment of a machine enabling said process to be carried out.

In these drawings:

FIGURE 1 shows, seen from above with parts cut away, one example of an embodiment of a machine according to the invention;

FIGURE 2 shows the extension of the machine beyond the right-hand end in FIGURE 1; and FIGURE 3 shows, in side view with parts broken away, a unit for blowing air, which may be hot, intended for drying the coatings.

A panel 1 of expanded phenol-formaldehyde resin, arranged vertically, is introduced between vertical rolls 2, adapted to guide it in the course of its longitudinal advance in the direction of the arrows F.

The panel 1 is treated in a plurality of successive stages:

projection of an adhesive substance by means of an atomizer unit 3;
application of a continuous covering sheet 4;
drying and polymerisation of the adhesive substance in an air blowing unit 5 (here hot air because the resin is thermosetting);
projection of a protective varnish by means of an atomizer unit 6, similar to the unit 3;
drying and polymerisation of said varnish in a blowing unit 7 (FIGURE 2), similar to the unit 5;
cooling by air blowing, at the ambient temperature, in a blowing unit 8 (preferable in the case of thermosetting resins, but generally optional in other cases).

The panel 1 is introduced by means of rolls 2 at the entrance to the atomizer unit 3.

This device comprises, at each side of the through passage and over the whole width of the panel 1, a vertical distributor manifold 9 equipped with two rows of horizontal nozzles 10.

Thus the finely divided adhesive substance is projected in a continuous manner as the panel 1 advances.

Then the panel 1, covered with its layer of adhesive substance, enters the device adapted to apply two continuous sheets 4 of protective material jointly to its two faces.

For this purpose, a roll of paper 11 is mounted on a vertical shaft 12 and held between two side plates 13 and 14, the position of which is such that the side plate 13 is situated substantially in the plane of the upper edge of the panel 1, while the side plate 14 is situated substantially in the plane of the lower edge.

The unrolled sheet is engaged over a cylinder 15 of reduced diameter, adapted to eliminate the longitudinal curvature of the paper.

Finally, the sheet 4 is applied to a cylinder 16, tangential to the through passage, by means of a pressure cylinder 17. The assembly comprising the two cylinders 16 and 17 ensures the drive of the sheet and facilitates its engagement when a roll is brought into service. The cylinder 16 then "rolls" on the panel as the latter advances, laying the sheet on said panel coated with its layer of adhesive substance. The cylinder 16, which is here metallic, is equipped with a rubber "sleeve" permitting an even application of the sheet to the panel with slight local pressure.

A spare roll 18 is ready to be brought into use immediately by means of a conventional device not shown on the drawings, in such a manner as to permit continuity in the operation of the machine and in the coating of the panel.

The panel 1, covered with the protective sheet, is then introduced into the unit 5 for blowing hot air, adapted on the one hand, to apply the sheet 4 against the panel 1 by the pressing force of the blown air and, on the other hand, to ensure the drying and the polymerisation of the adhesive substance.

For this purpose, a unit for blowing hot air comprises an electric motor 19, a fan 20, a grid constituted by electric resistances 21, the air circulating over said resistances then being directed onto the panels through a row of tubes 22 in which hot water can circulate, and likewise through a network of fine vertical fins 23 provided on the side of the frame of the blowing unit, facing the through passage.

The air displaced by the fan 20 is heated by the electric resistances 21 and possibly by the tubes 22 and distributed over the whole width of the panel 1; this enables the adhesive substances applied at 3 to be stabilized and hardened.

After leaving the blowing unit 5, the panel 1 is again introduced into an atomizer unit 6. This is adapted to project a protective varnish, for example a phenolic or polyester resin, onto the external surface of the panel. After this second projection, the panel 1 is introduced into a second unit for blowing hot air 7, identical to the unit 5.

Finally, a unit is provided for blowing air at the ambient temperature 8, at the end of the line, to cool the whole of the panel and permit its manipulation.

The panel can then be withdrawn at the exit from the machine.

Needless to say, the present invention is not limited to the actual terms of the above description but, on the contrary, comprises all the modifications within the scope of one skilled in the art.

In particular, the treatment cycle of the panel comprising an operation of atomizing an adhesive substance, then the application of a continuous sheet and finally the polymerisation of the adhesive substance by an air blast, can be repeated several times depending, on the one hand, on the strength required for the surface covering of the panels, as a function of their use, and on the other hand, on the mechanical characteristics of the sheet applied to the panel.

Moreover, the machine may comprise means for cutting out the upper and lower faces of the panel, according to the outline desired.

Furthermore, the number of rows of nozzles in the projection unit may vary, and these may not be vertical.

The heating means for the air may be any means known per se.

The term "panel means" as used herein is intended to define a rigid or semi-rigid panels, for instance, made of expanded thermosetting resin such as phenol-formaldehyde.

The term "setting" as used in connection with the adhesive substance which secures the strips to the panel means, or to the protective coating layer, is used in a generic sense to include polymerizing, hardening and/or drying.

Moreover, it is obvious that the panel may be of any other thermosetting material or of any rigid material, that the sheet 4 may consist of any material (paper, fabric, metal foil etc.), that the adhesive substance may be a conventional sticking material, or any synthetic resin capable of being polymerised, that the protective varnish may be any material, and that the means for coating with adhesive substance may of course be any suitable normal means without therefore departing from the scope of the present invention.

What I claim is:
1. A process for continuously applying a covering to panel means, comprising:
    (a) advancing the panel means, oriented substantially vertically between guides;
    (b) coating the opposite faces of the panel means with an adhesive substance;
    (c) continuously unrolling a covering strip onto each face, upon said adhesive substance and lightly, rollingly pressing the covering strips against the panel means to apply the covering strips to the adhesive substance; and, while said panel means remain oriented substantially vertically,
    (d) projecting air, at a temperature in the range between ambient temperature and 100° C. onto each of the strip-covered faces of the panel means to hold the covering strips against the panel means opposite faces while setting said adhesive substance.
2. The process of claim 1 further comprising subsequently, successively:
    (e) applying a protective coating layer to the exterior of at least one covering strip on the covered faces of said panel means; and
    (f) directing a blast of air against the coated covered panel means to set said protective coating layer.
3. The process of claim 1 further including:
    (e) repeating steps (a), (b), (c) and (d) at least once on the strip-covered panel means subsequent to the first performance of step (d) thereon.
4. The process of claim 3 further comprising subsequently, successively:
    (f) applying a protective coating layer to the exterior of at least one outer covering strip on the covered faces of said panel means; and
    (g) directing a blast of air against the coated covered panel means to set said protective coating layer.
5. The process of claim 1 wherein step (b) more particularly comprises coating the opposite faces of the panel means with a thermosetting adhesive resin; and wherein the air projected onto each of the strip-covered faces of the panel; means in step (d) is at a temperature of about 40° C.
6. The process of claim 5 further comprising subsequently, successively:
    (e) applying a protective coating layer of thermosetting resin to the exterior of at least one outer covering strip on the covered faces of said panel means;
    (f) directing a blast of warm air against the thermosetting resin protective coating layer to set said thermosetting resin; and
    (g) cooling the coated, covered panel means by blasting cold air thereagainst to permit handling of the coated, covered panel means.
7. Apparatus for continuously applying a covering to panel means, comprising in sequence:
    (a) guide means for holding the panel means oriented substantially vertically during transit thereof through said apparatus;
    (b) means for coating the opposite faces of said panel means with an adhesive substance;
    (c) means for applying a covering strip, with slight pressure, to each face of said panel means, upon said adhesive substance;
    (d) a plurality of air jets directed to project air onto each of the strip-covered faces of the panel means to hold the covering strips against the panel means opposite faces; and
    (e) means for setting said adhesive substance.
8. The apparatus of claim 7 wherein the means (e) comprise hot water tubes and electrical resistors and wherein the air issuing from said air jets (d) passes over said hot water tubes and electrical resistors before striking said covering strips.
9. The apparatus of claim 7 further comprising:
    (f) means downstream of means (e), for coating the exterior of at least one covered face of the panel means with a protective coating layer; and
    (g) means for setting said protective coating layer.
10. The apparatus of claim 9 further comprising:
    (h) a blower, downstream of means (g), for cooling said panel means.
11. The apparatus of claim 9 wherein the means (g) comprises a plurality of air jets.

12. The apparatus of claim 11 further comprising:
(h) a blower, downstream of means (g), for cooling said panel means.

13. The apparatus of claim 12 wherein the means (b) and (f) are atomizers and the means (c) comprises rolls mounted for rolling contact with the covered faces of the panel means.

References Cited

UNITED STATES PATENTS

| | | | |
|---|---|---|---|
| 2,513,708 | 7/1950 | Belcher | 156—280 |
| 2,706,699 | 4/1955 | Plansoen et al. | 156—324 |
| 2,937,938 | 5/1960 | Fiedler et al. | 75—20 |
| 3,002,873 | 10/1961 | Pickren | 156—205 |
| 3,037,900 | 6/1962 | Hings et al. | 156—549 XR |
| 3,267,902 | 8/1966 | Pritchard et al. | 118—324 XR |

EARL M. BERGERT, *Primary Examiner.*

G. W. MOXON II, *Assistant Examiner.*

U.S. Cl. X.R.

156—280, 390, 497, 578